Oct. 10, 1950

L. W. PARKER 2,524,828

COLOR TELEVISION RECEIVER

Filed Sept. 17, 1947

INVENTOR.
LOUIS W. PARKER
BY
Robert Harding Jr.
ATTORNEY

Patented Oct. 10, 1950

2,524,828

UNITED STATES PATENT OFFICE 2,524,828

COLOR TELEVISION RECEIVER

Louis W. Parker, Little Neck, N. Y., assignor to International Standard Electric Corporation, New York, N. Y., a corporation of Delaware Application September 17, 1947, Serial No. 774,500

10 Claims. (Cl. 178—5.4)

The present invention relates to television receivers, more particularly to improvements in a receiver of the character disclosed in my earlier United States Patent No. 2,144,379.

An object of the instant invention is to adapt a receiver of the above type to the reproduction of color images.

Another object of this invention is to provide means for minimizing the distortion of an image in a television receiver of the type referred to.

Other and further objects will become apparent in the course of the following description, reference being had to the accompanying drawing wherein:

Figs. 2, 3 and 4 are diagrams illustrating the improvements obtainable according to certain features of the instant invention.

Figure 1:
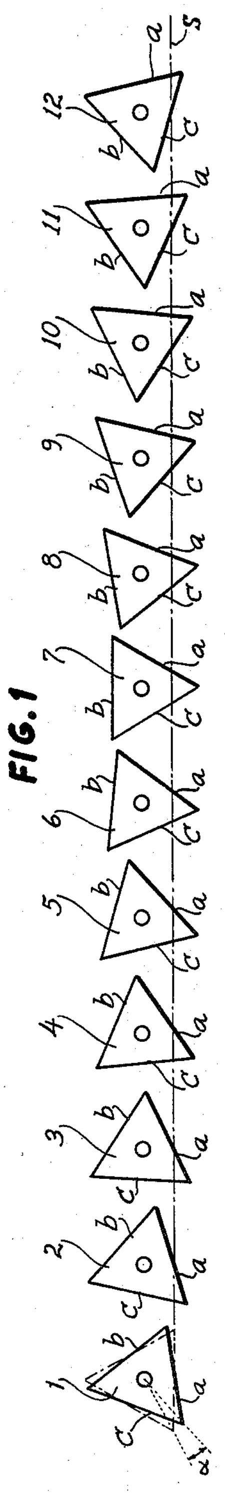
Fig. 1 shows a plan view of a receiving screen formed of a plurality of rotating mirror assemblies, similar to the arrangement shown in Fig. 4 of my above-mentioned patent.
Figure 1:
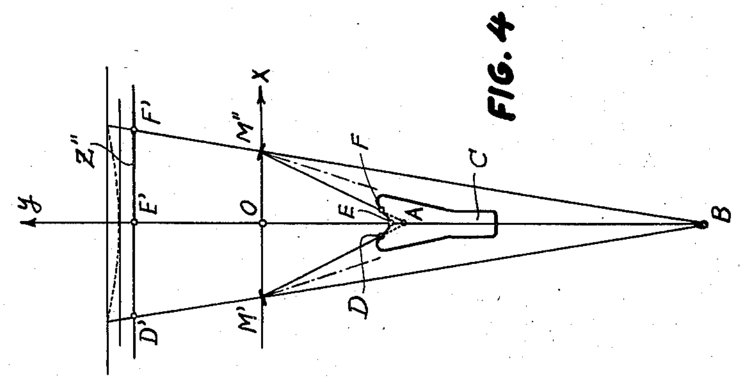
Figure 1:
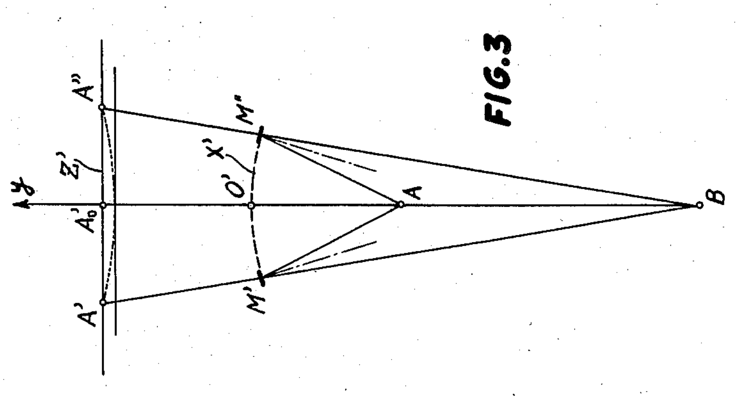
Figure 1:
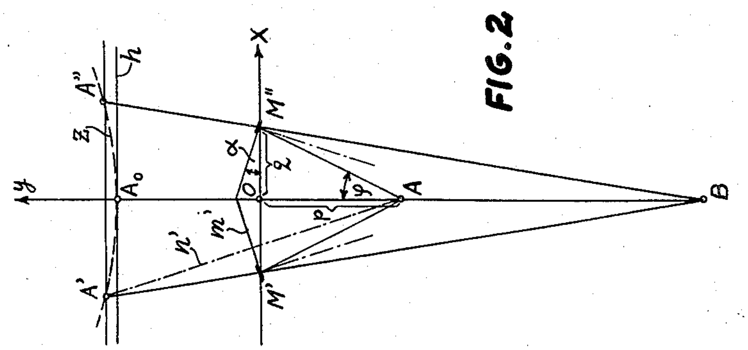

Referring now to Fig. 1, there is shown a receiving screen which is composed of a set of mirror assemblies aligned in a row and numbered 1 through 12, respectively. Each of the units 1 through 12 comprises three mirrors *a*, *b* and *c* forming an equilateral triangle, the twelve units rotating in unison at a speed which in my earlier patent has been assumed, in a particular instance, to be eight revolutions per second. For color reception according to a feature of the present invention it will be understood that this speed should be increased to preferably three times its value, or 24 revolutions per second, but the invention is not limited to any particular rate of rotation. An observer standing in front of the receiving screen, i. e. facing the surface *a* of unit 1, will have the impression of viewing the image in a stationary reflecting surface S as will be clear from the disclosure of my prior patent as well as from the detailed description given below.

In accordance with the principles underlying the present invention, as well as those of my earlier patent, the line scanning will be effected in conventional manner by the linear displacement of the beam of a cathode ray tube (not shown in Fig. 1) while the frame scanning will be accomplished by the suitably timed rotation of the mirror assemblies 1 through 12. In the embodiment illustrated, the line scanning will be vertical, i. e. in a direction perpendicular to the surface of the drawing, while the frame scanning will be horizontal; this contrasts with conventional practice but increases the horizontal field angle as fully described in my aforesaid patent. For the purposes of the present invention the direction of scanning is immaterial.

Let us now assume that the unit 1 has such a position that a vertical scanning line produced on the screen of a suitably placed cathode ray tube will be reflected toward an observer from the left-hand edge of the mirror surface *a*. This position may be denoted by the angle $\alpha$ which is the angle between the surface *a* and the plane S or the angle through which the unit 1 must rotate in a clockwise direction to reach a reference position shown in point dotted lines. Preferably, the cathode ray tube will be located on a line of symmetry passing between units 6 and 7, perpendicular to the plane S, and the observer's position will likewise be on or near that line. Then the clockwise rotation of unit 1 through an angle of $\alpha/6$ will cause the image seen by the observer to travel from the left-hand to the right-hand edge of mirror *a* thereof. At this instant the units 1 and 2 should both be in position $5\alpha/6$ and, because of the close spacing between mirror surfaces of adjacent units made possible by virtue of their staggered arrangement, the image leaving the right-hand edge of mirror *a* of unit 1 will immediately appear on the left-hand edge of the corresponding mirror of unit 2. In this manner it can be shown that after the units have rotated through the full angle $\alpha$ the image will have traveled to the adjoining edges of the mirrors *a* of units 6 and 7 which, at that instant, will coincide with the plane S. Also, after continued rotation through a similar angle, the image will disappear over the right-hand edge of mirror *a* of unit 12. Thus a frame will be completed upon rotation of the units through an angle of $2\alpha$.

With a screen about 12″ wide, a likely value for the angle $\alpha$ will be 9 degrees, with each mirror surface such as *a* rotating through $1\frac{1}{2}°$ before the image is passed on to the adjoining unit. Thus a frame will be completed after rotation of the units through an angle of 18° whereas rotation through another 102° will be necessary to bring the mirror *b* of unit 1 into the position $\alpha$ so as to initiate a new frame. I solve this problem by angularly displacing adjacent units by an angle of $10-1\frac{1}{2}=8\frac{1}{2}°$ or, more generally, $$\frac{120-2\alpha}{N}$$

degrees wherein N is the number of mirror assemblies (in the present case 12), and by retarding the rotation of each unit while it passes through its operating position, a method of effecting such retardation having been described and illustrated in my earlier patent with reference to Figs. 5, 6 and 7 thereof. In the present instance, the optimum amount of retardation will be such that each unit passes through its working angle of 1½° during 1/30 of the time necessary for each unit to make one full rotation. In order to accommodate observers at widely separated points it may, however, be necessary to maintain the retarded rate of rotation over an angle of several degrees.

According to a feature of the present invention, it is now proposed to adapt the arrangement of Fig. 1 for color reception. In conventional color television receivers the color filters are mounted on a rotating disc placed in front of a cathode ray tube. For the larger cathode ray tubes, say those 12 inches in size, the diameter of this disc will be nearly three feet corresponding at 20 R. P. M. to a peripheral velocity of approximately 180 feet per second. Such large disc running at 2 miles per minute are far from practical in a home, a fact that has greatly limited the use of 12 inch tubes for color television. The enlargement of the picture by projection is also impractical because of the high losses introduced by the color filters.

It has already been demonstrated that the arrangement shown in Fig. 1 will be the equivalent of a viewing screen of the order of 12'' in width, and in fact the apparent width of the reflected image will be somewhat greater than that of the screen. In accordance with the invention, each of the reflecting surfaces *a*, *b* and *c* of a mirror assembly is designed as a filter arranged to reflect a respective one of the three primary colors. This may be accomplished by covering each side of the mirror assembly with a thin sheet of gelatine absorbing all visible wavelengths except those of the desired primary color. Thus the surfaces *a* of all the units 1 through 12 may reflect only the red rays, the surfaces *b* the blue-violet rays, and the surfaces *c* the green rays. Hence, red, blue-violet and green frames each of, say, 240 lines will follow one another in cyclic succession to give the required visual impression.

In Fig. 2 there is shown a diagram indicating at A the position of the light source, in the form of a luminous spot on the screen of a cathode ray tube undergoing line scanning displacement in a direction perpendicular to the paper; B is the position of the observer, M' the mirror at the extreme left (corresponding to the unit 1 in Fig. 1), M'' the mirror at the extreme right (corresponding to unit 12 in Fig. 1), O the center of the apparent reflecting surface (corresponding to the adjoining edges of units 6 and 7 in Fig. 1), and A', $A_0$ and A'' the images of source A as viewed by the observer B in different positions of different mirrors, the plane S (Fig. 1) coinciding with the axis $x$.

The distance between points O and A is $p$ and that between points O and M' (or M'') is $q$. The distance between O and $A_0$ will be $p$; A' will lie on the line $n'$ which is normal to the plane $m'$ of mirror M', A and A' being equidistant from $m'$. A'' will be found in similar manner. It thus appears that the position of the images A', $A_0$ and A'' is independent from the position of the observer B. It must be borne in mind, however, that because of the limited width of the mirrors the angle $\alpha$ will have to be different for different points B and that, therefore, the apparent position of the image changes.

The magnitude of the angle $\alpha$ for a particular position B may be readily determined, no distinction being made in Fig. 2 between reflection on the edges or at the center of the mirrors M', M''. If B coincides with A, it can be shown that $\alpha$ will equal $\rho$ wherein $$\rho=\tan^{-1}\frac{q}{p}$$

in this case the locus of all the images of source A will be the line $h$ going through $A_0$. If, on the other hand, the distance $\overline{OB}$ becomes much greater than $\overline{OA}$, then that locus becomes a hyperbola of the formula $y^2-x^2=p^2$. For an intermediate position such as that shown in the drawing, the image will travel along the curve $z$ with $\alpha$ at a value of $k\rho$ where $k$ is between ½ and 1. It will of course be understood that the images A', $A_0$ and A'' appear successively and that the positions of mirrors M', M'' shown in Fig. 2 do not correspond to simultaneously positions of units 1 and 12 in Fig. 1.

For the assumed case of $\alpha=9°$, the distance of both A and B from O may be about 40'' where the width of each mirror is one inch; or the distance $p$ between O and A may be about two feet, corresponding to an angle $\rho$ of approximately 14°, with the distance between O and B correspondingly larger. No attempt has been made in Fig. 2 to show the arrangement in the above proportions.

There are several ways in which the curvature of line $z$ may be compensated. One such way is shown in Fig. 3 wherein reference characters corresponding to those of Fig. 2 have the same significance. In this arrangement, the collective front of the mirror surfaces, indicated at S in Fig. 1, has been curved as shown at $x'$ to give a center point O' lying beyond point O in Fig. 2. With proper selection of the distance $\overline{O'A}$ the image will travel on a straight line $z'$ as compared to the dotted line corresponding to curve $z$ of Fig. 2.

Fig. 4 shows a different arrangement for making the image appear on a substantially straight line. In this arrangement, I use a cathode ray tube C having a concave screen on which the luminous spot undergoes limited frame scanning displacement between points D, E and F in synchronism with the frame scanning displacement imparted thereto by its varied reflection in the rotating mirrors. At the beginning of a cycle the spot will form a vertical line in position D having an image D'; in the middle of the cycle the line will be in position E with its image at E', and at the end of the cycle the image F' will correspond to a line in position F. The locus of all the images thus produced will be the straight line $z''$. The point A has been shown for purposes of comparison and has no physical significance in Fig. 4.

The illustrations given in Figs. 2, 3 and 4 are strictly schematic. Thus, a half silvered mirror (not shown) may be interposed between the cathode ray tube and the rotating mirrors to let the observer view the picture from a position which may be optically equivalent to that shown in the drawing but may be physically displaced therefrom. It will also be apparent that compensation of curvature may be effected by combining the features of the arrangements shown in Figs. 2 and 3, i. e. by using a concave cathode ray tube in combination with the curved mirror front. Furthermore, lenses and/or prisms such as shown in Figs. 1, 2 and 3 of my earlier patent may be used to project the light from the cathode ray tube upon the mirror surfaces.

It is believed that in a practical arrangement it will be found most convenient to position the observer or observers behind the cathode ray tube, and for this reason such an arrangement has been illustrated in Figs. 2, 3 and 4. It should be readily understandable, however, that similar conditions exist where the observer is stationed in front of the light source, except that the curve $z$ shown in Fig. 2 will be inverted and compensation will have to be made accordingly. Thus it will be necessary in the latter case to invert the shape of the curve $x'$ in the arrangement of Fig. 3 or to substitute a convex screen surface for the concave one shown on the cathode ray tube C in Fig. 4.

From the foregoing it will be clear that, while I have disclosed certain preferred embodiments, the present invention is not limited thereto and that adaptations and modifications thereof may be made by persons skilled in the art without departing from its spirit and scope, the latter being defined solely in the objects and in the appended claims.

What is claimed is:

1. In a television receiver, in combination, a source of light, and a viewing screen formed of a plurality of mirror assemblies each comprising three reflecting surfaces mounted in the form of an equilateral triangle, each assembly being rotatable about its own axis and angularly displaced relative to its neighbor so that the average angle between respective surfaces of adjacent assemblies is substantially given by the formula $$\frac{120-2\alpha}{N}$$

degrees where N is the number of mirror assemblies and $2\alpha$ the angular displacement between reflecting surfaces at the extreme ends of the viewing screen when said surfaces are in position to show the image of the said light source to a fixed observer, said mirror assemblies being mounted with their axes along a curve for reducing the curvature of the locus of the various images of said source as viewed in the reflecting surfaces of respective mirror assemblies by said fixed observer.

2. In a television receiver, the combination according to claim 1 wherein said source of light comprises a luminous spot on the screen of a cathode ray tube, said luminous spot being subject to limited scanning displacement in a direction parallel to the axes of said assemblies and in a direction transverse to said axes, said latter displacement being in synchronism with the rotation of said mirror assemblies, and the screen of the cathode ray tube being curved in such a manner as to reduce the curvature of said locus.

3. In a television receiver, the combination according to claim 1 wherein said curve is concave with respect to said source.

4. A television apparatus comprising a source of light formed by a luminous spot subject to line scanning displacement along a first screen, and a viewing screen comprising a plurality of mirror assemblies rotatable to simulate frame scanning displacement, each of said assemblies comprising three reflecting surfaces forming an equilateral triangle, one of said screens being concave with respect to the other in a direction perpendicular to the direction of line scanning displacement for reducing the curvature of the picture produced by said luminous spot as viewed by an observer in the said reflecting surfaces.

5. An apparatus according to claim 4 wherein said mirror assemblies are rotatable about respective parallel axes, said axes being arranged along an arc curved so as to reduce the curvature of said picture.

6. An apparatus according to claim 4 wherein said luminous spot is also subject to limited frame scanning displacement in synchronism with that simulated by said mirror assembly, the first screen being concave with respect to the viewing screen so as to reduce the curvature of said picture.

7. A television apparatus comprising a source of light including a first screen, means for producing a luminous spot on said screen and means for deflecting said spot along said screen, and a viewing screen comprising a plurality of rotatable mirror assemblies, said assemblies being mounted with their axes along a curve for reducing the curvature of a picture reflected therein.

8. A television apparatus according to claim 7 wherein said curve is concave with respect to said source.

9. A television apparatus comprising a source of light including a first screen, means for producing a luminous spot on said screen and means for deflecting said spot along said screen, and a viewing screen comprising a plurality of rotatable mirror assemblies, one of said screens being concave with respect to the other in a direction perpendicular to the direction of the axes of said assemblies whereby the curvature of a picture viewed in said assemblies by an observer is reduced.

10. A television apparatus according to claim 9 wherein said first screen is concave with respect to said viewing screen.

LOUIS W. PARKER.

REFERENCES CITED

The following references are of record in the file of this patent:

UNITED STATES PATENTS

| Number | Name | Date |
|---|---|---|
| 2,144,379 | Kolozsy | Jan. 17, 1939 |
| 2,302,147 | Schade | Nov. 17, 1942 |
| 2,351,294 | Schade | June 13, 1944 |
| 2,431,115 | Goldsmith | Nov. 18, 1947 |